(12) United States Patent  
Hazel et al.

(10) Patent No.: US 11,376,620 B2
(45) Date of Patent: Jul. 5, 2022

(54) PRESSURE WASHER

(71) Applicant: TECHTRONIC CORDLESS GP, Anderson, SC (US)

(72) Inventors: Jared Hazel, Anderson, SC (US); Liang Yong Zhi, Guangdong Province (CN); Sven Eschrich, Guangdong Province (CN); Yang Shao Kang, Guangdong Province (CN)

(73) Assignee: Techtronic Cordless GP, Anderson, SC (US)

( * ) Notice: Subject to any disclaimer, the term of this patent is extended or adjusted under 35 U.S.C. 154(b) by 0 days.

(21) Appl. No.: 16/831,644

(22) Filed: Mar. 26, 2020

(65) Prior Publication Data

US 2021/0138499 A1 May 13, 2021

(30) Foreign Application Priority Data

Nov. 13, 2019 (CN) .......................... 201921954961.0

(51) Int. Cl.
*B05B 15/14* (2018.01)
*B05B 9/01* (2006.01)

(52) U.S. Cl.
CPC ................ *B05B 15/14* (2018.02); *B05B 9/01* (2013.01)

(58) Field of Classification Search
CPC .................................. B05B 15/14; B05B 9/01
USPC ........................................................ 239/526
See application file for complete search history.

(56) References Cited

U.S. PATENT DOCUMENTS

| | | |
|---|---|---|
| 1,864,188 A | 6/1932 | Deutsch |
| 4,506,805 A | 3/1985 | Marcon |
| 4,865,255 A | 9/1989 | Luvisotto |
| 4,986,454 A | 1/1991 | Riley |
| 5,071,069 A | 12/1991 | Stirm |
| 5,154,317 A | 10/1992 | Roppolo |
| 5,716,007 A | 2/1998 | Nottingham et al. |
| 5,775,591 A | 7/1998 | Fauci |
| 6,311,903 B1 | 11/2001 | Gaw et al. |
| 6,321,945 B1 | 11/2001 | Girouard et al. |
| 6,811,099 B2 | 11/2004 | Krestine et al. |
| 6,984,901 B2 | 1/2006 | Wong et al. |
| 7,021,571 B1 | 4/2006 | Lawson et al. |
| 7,028,925 B2 | 4/2006 | Guest et al. |
| 7,032,841 B1 | 4/2006 | Swisher |
| 7,090,148 B2 | 8/2006 | Petrie et al. |
| 7,178,743 B2 | 2/2007 | Clarke, III et al. |
| 7,219,848 B2 | 5/2007 | Sweeton |
| 7,261,220 B2 | 8/2007 | Campbell et al. |
| 7,568,636 B2 | 8/2009 | Saunders et al. |

(Continued)

FOREIGN PATENT DOCUMENTS

| | | |
|---|---|---|
| AU | 2013206665 B2 | 7/2015 |
| AU | 2014201322 B2 | 2/2016 |

(Continued)

*Primary Examiner* — Christopher S Kim
(74) *Attorney, Agent, or Firm* — Dority & Manning, P.A.

(57) ABSTRACT

The utility model discloses a pressure washer which comprises a water-sealed battery part and a main body part, wherein the water-sealed battery part comprises a shell formed by connecting a cover body and a lower cavity, and a battery pack is arranged in the shell. The pressure washer of the utility model is simple and ingenious in structural design, can effectively improve the sealing effect of the shell and prevent water from entering.

15 Claims, 10 Drawing Sheets

(56) References Cited

U.S. PATENT DOCUMENTS

| | | | |
|---|---|---|---|
| 7,815,130 B2 | 10/2010 | Joseph et al. |
| 7,905,831 B2 | 3/2011 | Noguchi et al. |
| 7,926,740 B2 | 4/2011 | Parris et al. |
| 8,319,654 B2 | 11/2012 | Field et al. |
| 8,336,789 B2 | 12/2012 | Kuo |
| 8,366,023 B1 | 2/2013 | Lin |
| 8,430,337 B2 | 4/2013 | Pearce, III et al. |
| 8,496,188 B2 | 7/2013 | Linton et al. |
| 8,602,323 B2 | 12/2013 | Bearup et al. |
| 8,628,029 B2 | 1/2014 | Munn et al. |
| 8,678,238 B2 | 3/2014 | Brunk et al. |
| 8,857,732 B2 | 10/2014 | Brose et al. |
| 9,061,301 B2 | 6/2015 | B?hr et al. |
| 9,149,821 B2 | 10/2015 | Micheli et al. |
| 9,180,472 B2 | 11/2015 | Munn et al. |
| 9,283,580 B2 | 3/2016 | Isley |
| 9,421,563 B2 | 8/2016 | Venard et al. |
| 9,475,073 B2 | 10/2016 | Kinne et al. |
| 9,545,643 B2 | 1/2017 | Thompson et al. |
| 9,561,516 B2 | 2/2017 | Decker |
| 9,604,236 B2 | 3/2017 | Sandahl et al. |
| 9,616,434 B2 | 4/2017 | Pan |
| 9,636,715 B1 | 5/2017 | Barnes |
| 10,006,216 B1 | 6/2018 | Ronconi |
| 10,016,771 B2 | 7/2018 | Zheng |
| 10,040,085 B2 | 8/2018 | Burns |
| 10,099,234 B2 | 10/2018 | Crawford |
| 10,099,235 B2 | 10/2018 | Reale |
| 10,112,204 B2 | 10/2018 | Schrum et al. |
| 10,130,962 B2 | 11/2018 | Dey et al. |
| 10,391,507 B2 | 8/2019 | Borinato |
| 2005/0082389 A1 | 4/2005 | Sanchez et al. |
| 2010/0233646 A1 | 9/2010 | Brokx |
| 2011/0057436 A1 | 3/2011 | Schrum et al. |
| 2011/0315788 A1 | 12/2011 | Henderson |
| 2014/0131475 A1 | 5/2014 | Borinato |
| 2015/0050169 A1 | 2/2015 | Horie et al. |
| 2015/0251223 A1 | 9/2015 | Horie et al. |
| 2015/0306614 A1 | 10/2015 | Pierce |
| 2016/0016207 A1 | 1/2016 | Horie et al. |
| 2016/0038960 A1 | 2/2016 | Fontaine |
| 2016/0151799 A1* | 6/2016 | Reale ............... B05B 9/0426 239/526 |
| 2016/0236217 A1 | 8/2016 | Jenkins |
| 2016/0296980 A1 | 10/2016 | Zheng |
| 2017/0106385 A1 | 4/2017 | Schrum et al. |
| 2017/0122304 A1 | 5/2017 | Funabashi et al. |
| 2017/0128971 A1 | 5/2017 | Paunescu et al. |
| 2017/0232482 A1 | 8/2017 | Fischer et al. |
| 2017/0304873 A1 | 10/2017 | Luby et al. |
| 2017/0319040 A1 | 11/2017 | Whitbread et al. |
| 2018/0029056 A1 | 2/2018 | Alexander et al. |
| 2018/0071792 A1 | 3/2018 | Spengler et al. |
| 2018/0193854 A1 | 7/2018 | Haney |
| 2018/0216611 A1 | 8/2018 | Xu |
| 2018/0281000 A1 | 10/2018 | Patel et al. |
| 2018/0290180 A1 | 10/2018 | Luby |
| 2018/0328349 A1 | 11/2018 | Wu et al. |
| 2018/0339303 A1 | 11/2018 | Inoue et al. |
| 2019/0030554 A1* | 1/2019 | Mantes ............... B05B 9/0861 |
| 2019/0060928 A1 | 2/2019 | Gutsmann et al. |
| 2019/0151873 A1 | 5/2019 | Franks |
| 2019/0193122 A1 | 6/2019 | Liu |
| 2019/0283061 A1 | 9/2019 | Qiao |
| 2019/0388917 A1 | 12/2019 | Gerhardt et al. |

FOREIGN PATENT DOCUMENTS

| | | |
|---|---|---|
| CA | 2370612 A1 | 10/2000 |
| CA | 2532258 A1 | 1/2005 |
| CA | 2263617 C | 9/2007 |
| CA | 2742634 A1 | 12/2012 |
| CA | 3017953 A1 | 9/2017 |
| CA | 2891819 C | 1/2018 |
| WO | 2009106487 A1 | 9/2009 |
| WO | 2014118585 A2 | 8/2014 |
| WO | 2014205923 A1 | 12/2014 |
| WO | 2017133322 A1 | 8/2017 |
| WO | 2017161073 A1 | 9/2017 |
| WO | 2017206933 A1 | 12/2017 |
| WO | 2017215596 A1 | 12/2017 |
| WO | 2018028769 A1 | 2/2018 |
| WO | 2018033324 A1 | 2/2018 |
| WO | 2018075526 A1 | 4/2018 |
| WO | 2018140753 A1 | 5/2018 |
| WO | 2018103669 A1 | 6/2018 |
| WO | 2018166164 A1 | 9/2018 |
| WO | 2018184659 A1 | 10/2018 |
| WO | 2018192838 A1 | 10/2018 |
| WO | 2019098042 A1 | 5/2019 |
| WO | 2019170678 A1 | 9/2019 |

* cited by examiner

PRESSURE WASHER

This application claims the benefit of priority to Chinese Patent Application No. 201921954961.0, filed on Nov. 13, 2019, the disclosure of which is incorporated by reference herein in its entirety.

TECHNICAL FIELD

The invention relates to the technical field of high-pressure cleaning apparatus, in particular to a handheld pressure washer.

BACKGROUND ART

As shown in FIG. 1, the conventional high-pressure cleaning apparatus comprises an upper shell 1' and a lower shell 2', wherein the inner cavity of the upper shell 1' is divided into a battery cavity 4', a motor cavity 5' and a pump cavity 6' by a partition 3', the lower shell 2' is a water storage tank, and a battery pack 7' is detachably accommodated in the battery cavity 5'; the partition 3' is provided to prevent the cleaning liquid in the pump cavity 6' from flowing into the battery cavity 4' and the motor cavity 5', and the sealing member 8' is provided between the pump cavity 6' and the battery cavity 4' and between the pump cavity 6' and the motor cavity 5' to prevent the cleaning liquid from leaking therebetween.

However, the sealing member 8' between the battery cavity 4' and the motor cavity 5' and the pump cavity 6' of the existing high-pressure cleaning apparatus only has a one-way sealing effect for preventing the cleaning liquid from entering. If the sealing effect is good, the pressure in the battery cavity is easily increased, and the high-pressure gas is not discharged, so that the potential safety hazard exists.

Therefore, how to design a pressure washer capable of solving the above-mentioned problem is a subject of intensive research by the present inventor.

SUMMARY OF THE UTILITY MODEL

The utility model aims to provide a pressure washer which is simple and ingenious in structural design, can effectively improve the sealing effect of a shell and prevent water from entering. In order to achieve the above object, the utility model provides a pressure washer, which comprises a water-sealed battery part and a main body part, wherein the water-sealed battery part comprises a shell formed by connecting a cover body and a cavity, and a battery pack is arranged in the shell.

Preferably, the cavity is of a structure opened at upper end or opened at side surface and the cover body covers an open end of the cavity.

Preferably, a waterproof seal or a one-way seal is arranged between the cover body and the cavity.

Preferably, the one-way seal is a one-way sealing strip made of a soft sealing material.

Preferably, the cover body and the cavity are snap-connected by concave-convex fitting structures, and the sealing, strip is arranged between the concave-convex fitting structures.

Preferably, a portion of an outer surface of the sealing strip contacted with the cover body and the cavity has a plurality of grooves.

Preferably, a lower end of a rear surface of the cover body is lower than a lower end of a front surface thereof, lower ends of both side surfaces of the cover body are symmetrically S-shaped, and surface shape of an open end of the cavity is matched with a shape of a lower surface of the cover body.

Preferably, a pin end of the battery pack abuts upwards on the cover body, and an O-shaped sealing ring is arranged between the pin end and the cover body.

Preferably, the main body part is provided above the water-sealed battery part, the main body part including, a main body shell on which a combination switch is mounted and a power mechanism for pumping water, the combination switch including a trigger pivotably mounted on the main body shell, one end of the trigger connected with a water inlet valve, the water inlet valve being arranged at a water inlet of the main body shell, the water inlet being communicated with a water inlet channel in the main body shell, another end of the trigger abutting against a power switch valve of the power mechanism, and when the trigger is pressed; the water inlet valve and the power switch valve being simultaneously opened to work.

Preferably, a safety pin movable in a lateral direction is mounted on the main body shell at a rear side of the trigger, and the safety pin is pressed against a rear end of the trigger by moving a position of the safety pin, thereby preventing accidental depression of the trigger.

Preferably, a cross section of the safety pin is polygonal, the safety pin is provided with an open slot at a position opposite to a position of the trigger, and when the safety pin is moved, an outer edge of the safety pin is stopped against the rear end of the trigger or the trigger is rotatable in the open slot.

Preferably, the power mechanism comprises a motor connected to the battery pack by means of an electric wire, the motor being connected to a pinion of a gear mechanism, an internal gear of the gear mechanism being connected to an eccentric shaft by means of a bearing, the eccentric shaft being connected to a piston by means of a bearing, the piston being arranged in a piston cavity in the main body shell through a sealing material, a water outlet being arranged on the main body the water outlet being communicated with a water outlet channel arranged in the main body shell, and the water inlet channel and the water outlet channel being able to be communicated with or separated from the piston cavity through an one-way valve respectively.

Preferably, the power switch valve is a motor switch valve.

Preferably, the water outlet is connected to a nozzle part comprising a plurality of nozzles, adjacent nozzles being connected together by a quick connector comprising a clamping, plate with an opening in middle, end portions of the adjacent nozzles being plugged together, an annular groove being formed on an outer surface of plugged ends of the adjacent nozzles, the clamping plate being sleeved on the annular groove, and a bottom surface of an opening of the clamping plate being attached to a bottom surface of the annular groove, and the adjacent nozzles being clamped together.

Preferably, a height of the opening is greater than a height of the annular groove.

After the foresaid solutions are adopted, the pressure washer of the utility model has the following beneficial effects:

1. the battery pack is sealed in the shell through the soft sealing material, so that water outside the pressure washer is effectively prevented from entering, the shell, and the waterproof capacity is greatly improved; moreover, the soft sealing material has a one-way sealing effect, and when the pressure inside the shell rises, the pressure can be timely released outwards, and the safety is greatly improved;

2. by arranging the combination switch, the water inlet valve and the power switch valve can be actuated at the same time, the working efficiency can be greatly improved, the structure is simple and ingenious, the safely pin is arranged, the trigger is prevented from being accidentally touched, and the use safety of the pressure washer is improved;

3. the power mechanism drives the transmission mechanism through the motor, the transmission mechanism drives the eccentric shaft to rotate, the piston on the eccentric shaft realizes linear reciprocating motion, the piston plays a pumping role, the use of the pump is omitted, the volume of the main body part is reduced, and the pressure washer is more convenient to use, small and practical; and 4. the quick connector is adopted for connecting the adjacent nozzles, which is suitable for connecting the nozzles with different sizes and simple in structure and convenient to disassemble and assemble.

REFERENCE NUMBERS

Figure 1:
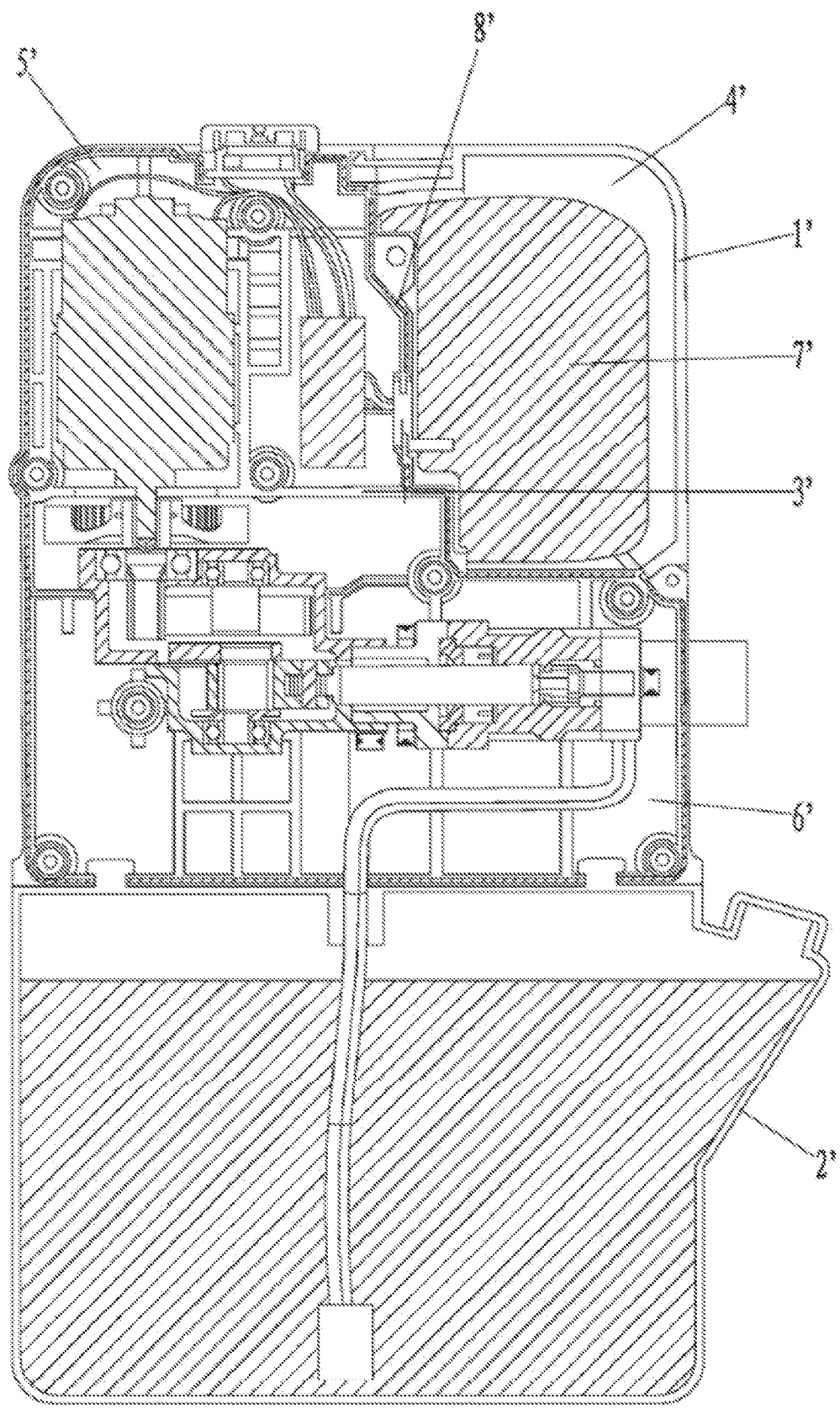
FIG. 1 is a schematic structural view of a conventional high-pressure washer.

1'-shell; 2'-lower shell; 3'-partition; 4'-battery cavity;
5'-motor cavity; 6'-pump cavity; 7'-battery pack; 8'-sealing member;
1-water-sealed battery part; 2-main body part; 3-nozzle part; 4-cover body;
5-cavity; 6-shell; 7-annular rib; 8-annular inner wall;
9-annular groove; 10-sealing strip; 11-groove; 12-battery pack;
13-electric wire; 14-pin end; 15-sealing, ring; 16-main body shell;
17-trigger; 18-connecting line; 19-water inlet valve; 20-water inlet;
21-water inlet channel; 22-water outlet channel; 23-power switch valve; 24-safety pin;
25-open slot; 26-motor; 27-pinion; 28-internal gear;
29 bearing; 30-eccentric shaft; 31-hearing; 32-piston;
33-water-sealed sealing ring; 34-O-shaped sealing ring;
35-piston cavity; 36-first water inlet cavity;
37-second water inlet cavity; 38-first one-way valve; 39-second one-way valve; 40-water outlet;
41-threaded joint; 42-nozzle; 43-quick connector; 44-opening;
45-clamping plate; 46-annular groove; 47-stop plate; 48-first hinge seat;
49-second hinge seat; 50-pin shaft; 51-O-shaped sealing ring.

DETAILED DESCRIPTION OF THE INVENTION

The utility model is described below according to an embodiment shown in the drawings. The presently disclosed embodiments are to be considered in all respects as illustrative and not restrictive. The scope of the utility model is not limited by the description of the following embodiments, but is only indicated by the scope of the claims, and includes all modifications that have the same meaning as the scope of the claims and are within the scope of the claims.

Hereinafter, the structure of the pressure washer according to the present utility model will be described in detail with reference to the accompanying drawings.

Figure 2:
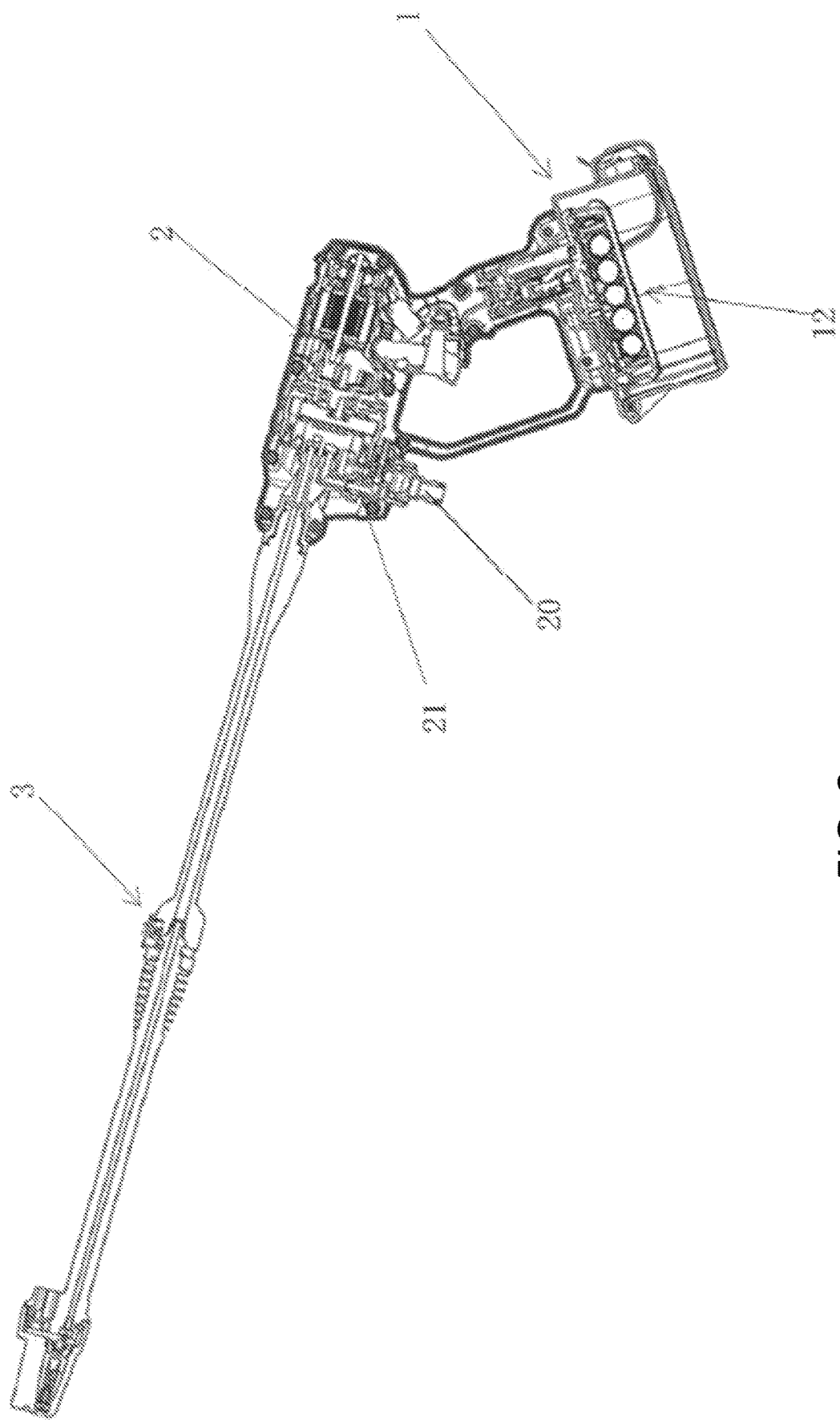
FIG. 2 is a schematic structural view of embodiment 1 of the pressure washer of the utility model.

FIG. 2 is a schematic structural view of embodiment 1 of the pressure washer of the utility model, which from bottom to top sequentially comprises:

a water-sealed battery part 1: providing a main body part with power supply;

a main body part 2: forming a power mechanism into a water pump;

a nozzle part 3: for ejecting water pumped by the main body part 2 and being provided at one side of the main body part.

Figure 3:
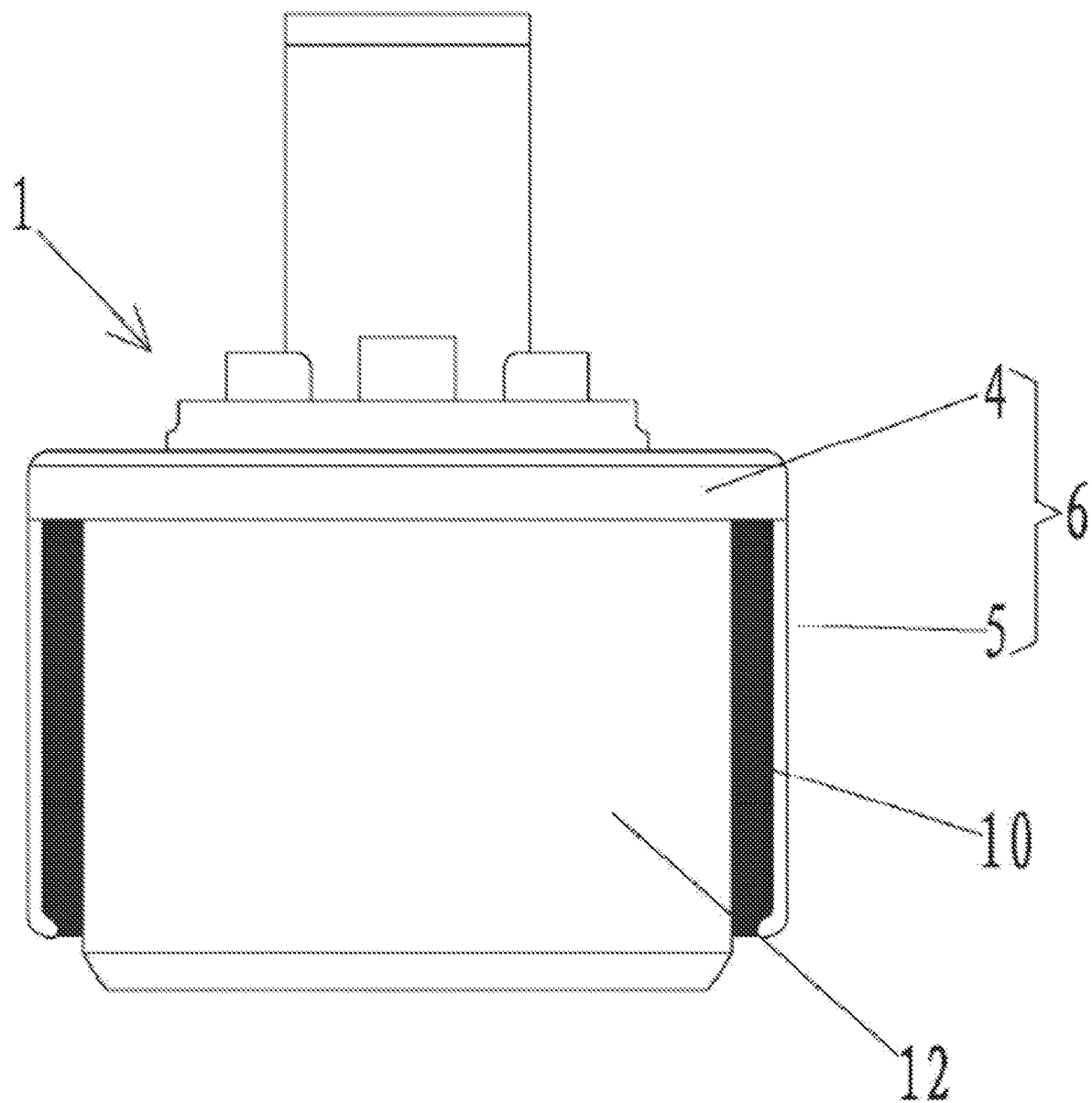
FIG. 3 is a front schematic structural view of a water-sealed battery part of embodiment 1 of the pressure washer of the utility model.
Figure 4:
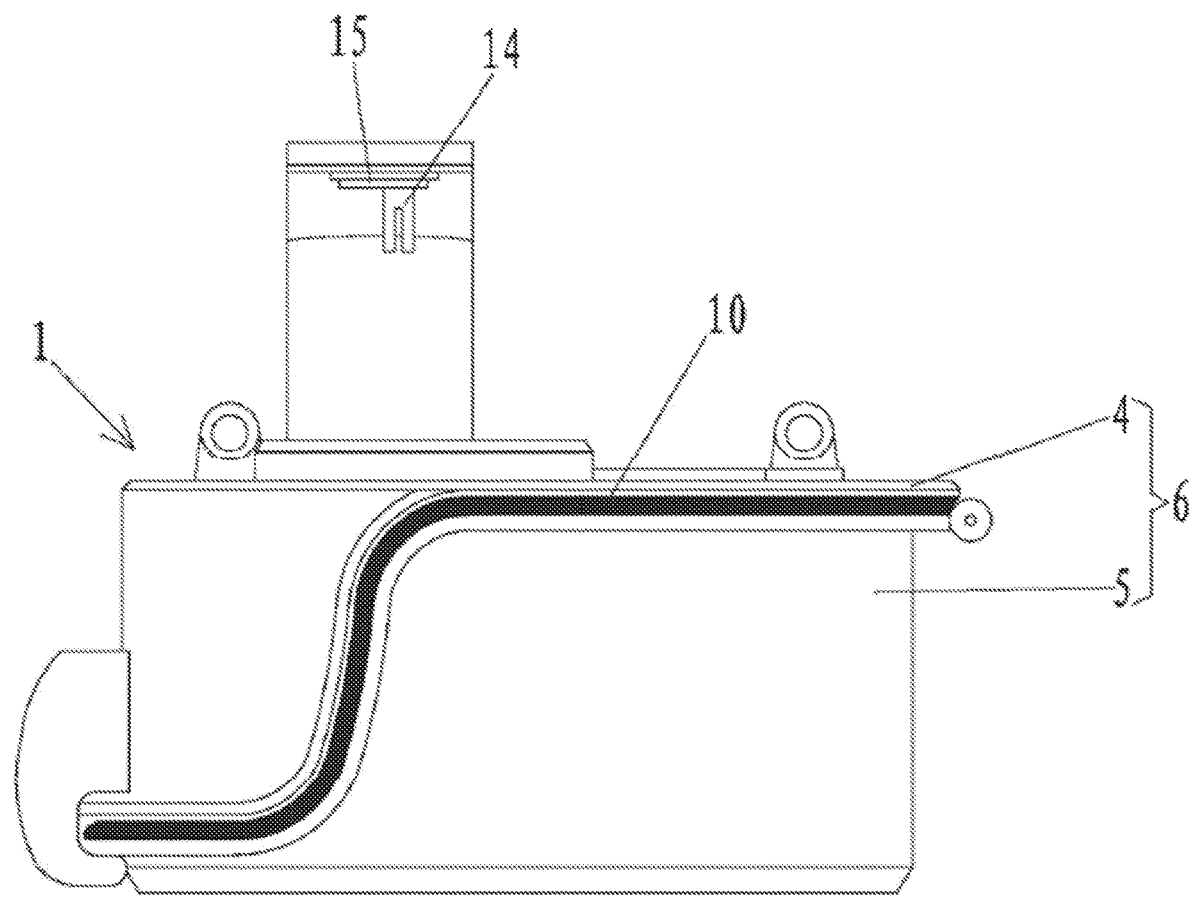
FIG. 4 is a left schematic structural view of a water-sealed battery part of embodiment 1 of the pressure washer of the utility model.

Referring to FIGS. 3 and 4, the water-sealed battery part 1 includes a shell 6 formed by connecting a cover body 4 and a cavity 5 open at upper end or open at side surface. In the present embodiment, the cavity 5 is opened at upper end, with the cover body 4 covering open end of the cavity 5.

A lower end of a rear surface of the cover body 4 is lower than a lower end of a front surface thereof, lower ends of a left side surface and a right side surface of the cover body 4 are symmetrically S-shaped, and a shape of upper open end of the cavity 5 is matched with a shape of a lower surface of the cover body 4.

Figure 5:
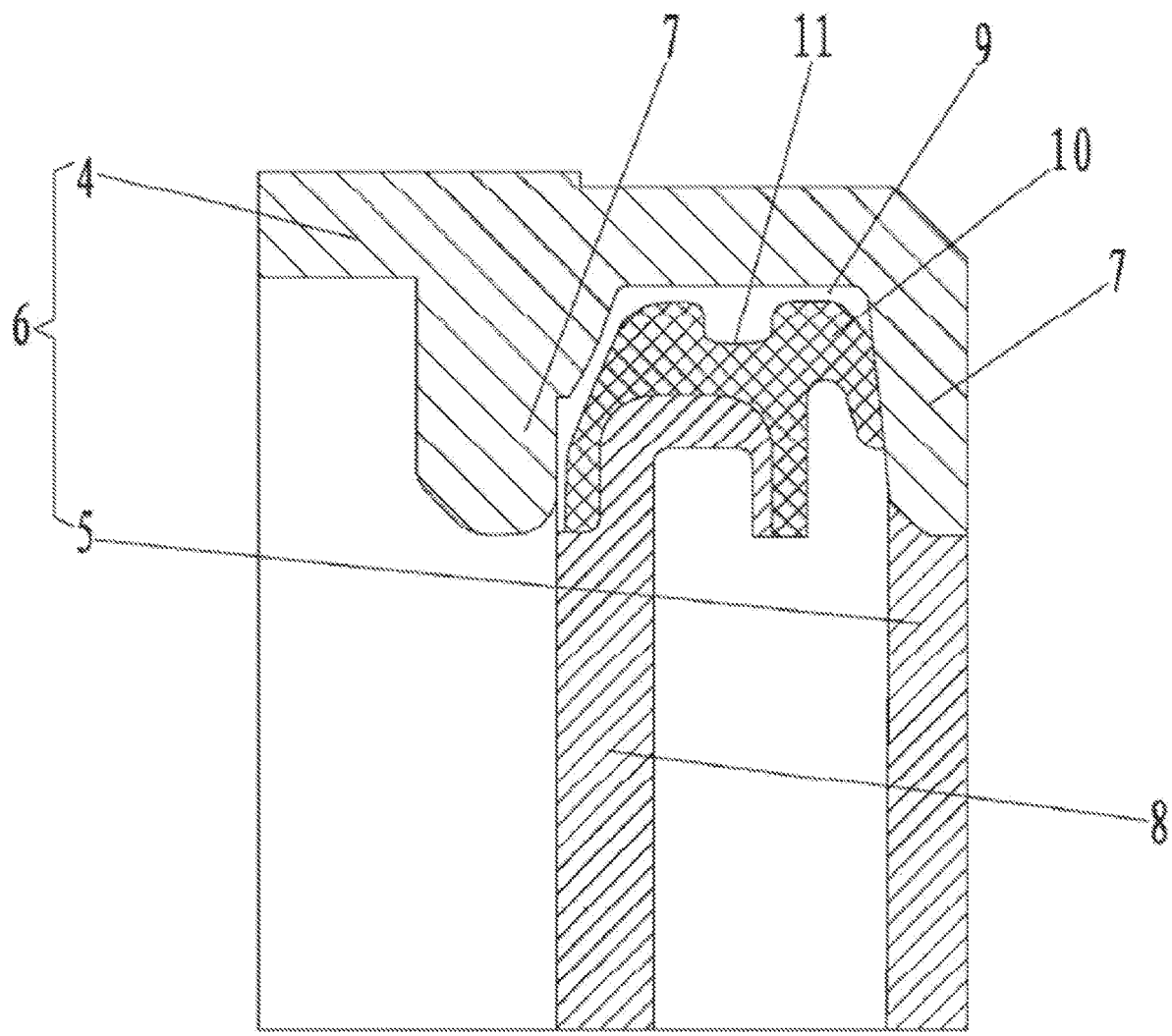
FIG. 5 is a partial schematic structural view of a water-sealed battery part of embodiment 1 of the pressure washer of the utility model.

The cover body 4 and the cavity 5 are snap-connected by concave-convex fitting structures. The concave-convex fitting structures in the embodiment comprise two annular ribs 7 arranged on the lower surface of the cover body 4 along a circumferential direction and an annular inner wall 8 arranged in an inner cavity of the cavity 5. The upper part of the annular inner wall 8 is in the shape of a hook bent outwards, and an annular groove 9 is formed between the two annular ribs 7. The upper part of the annular inner wall 8 is arranged in the annular groove 9, a shape of a lower end of the annular rib 7 corresponds to the shape of the lower end of the cover body 4, and a shape of an upper end of the annular inner wall 8 corresponds to a shape of an upper end of the cavity 5. A seal is arranged between the cover body 4 and the cavity 5, the seal in the embodiment adopts a sealing strip 10 which is waterproof and can release high-pressure gas outwards, and the sealing strip 10 is made of a soft sealing material. Referring to FIG. 5, the sealing strip 10 is disposed between the concave-convex fitting structures, and the portion of an outer surface of the sealing strip 10 contacting the cover body 4 and the cavity 5 has a plurality of grooves 11.

A battery pack 12 is provided inside the shell 6, and the battery pack 12 is electrically connected to the main body part 2 through an electric wire 13. A pin end 14 of the battery pack 12 abuts upward against the lower surface of the cover body 4, and an O-shaped sealing ring 15 is arranged between the pin end 14 and the cover body 4.

The battery pack 12 is sealed through the soft sealing strip 10, so that water outside the pressure washer is effectively prevented from entering the shell 6, and the waterproof capacity is greatly improved; moreover, the soft sealing strip 10 has a one-way sealing effect, and thus when the pressure in the shell 6 rises, the pressure can be released outwards in time, which means the safety is greatly improved.

The main body part 2 comprises a main body shell 16 and a power mechanism for pumping water, wherein the main body shell 16 is formed by connecting a horizontal part and a handle part.

Figure 6:
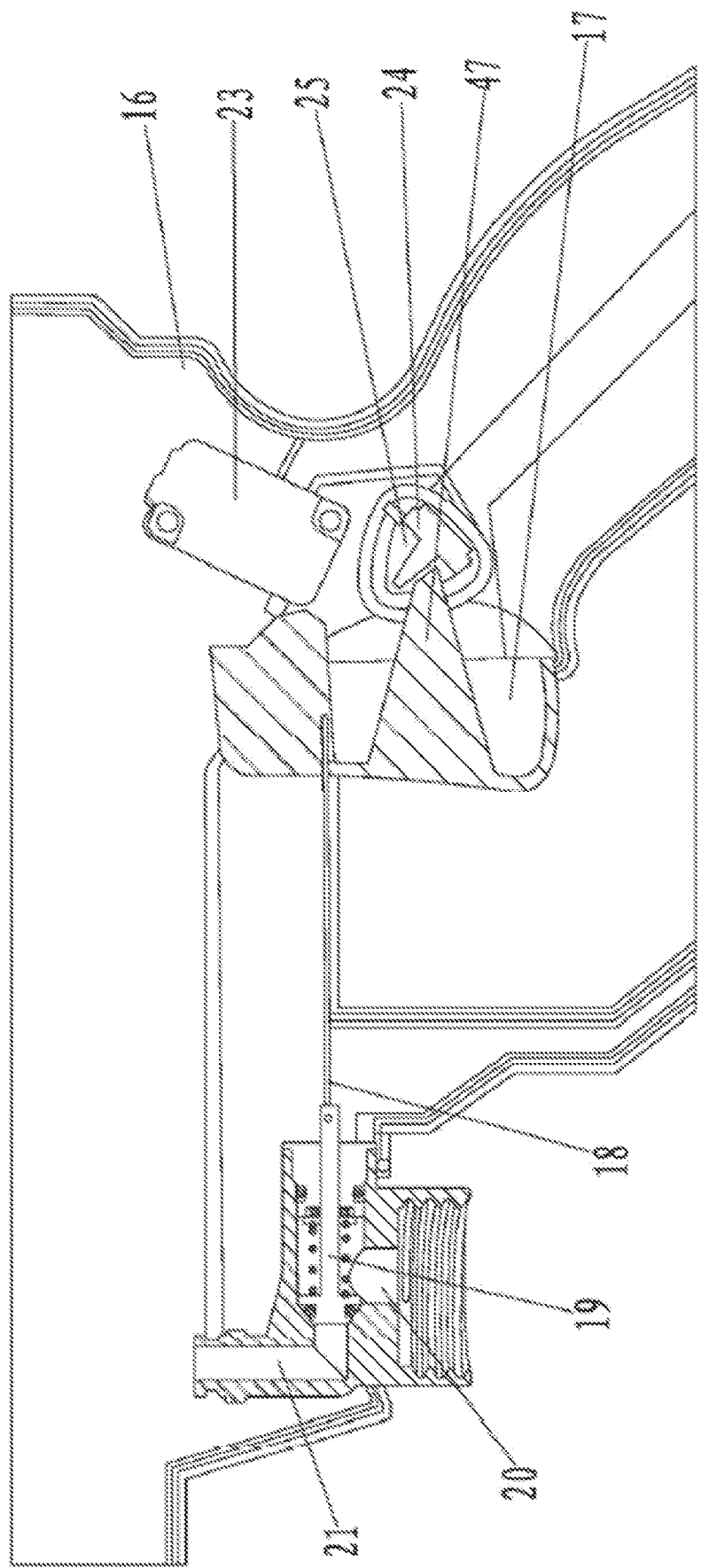
FIG. 6 is a schematic structural view of a combination switch of embodiment 1 of the pressure washer of the utility model.

Referring to FIG. 6, a combination switch is mounted on the main body shell 16. The combination switch comprises a trigger 17 pivoted on the main body shell 16, a left end of the trigger 17 of the embodiment is connected with a water inlet valve 19 through a connecting line 18, the water inlet valve 19 is arranged at a water inlet 20 at a lower end of the horizontal part of the main body shell 16, and a water inlet channel 21 and a water outlet channel 22 are arranged in the horizontal part. The water inlet channel 21 is positioned below the water outlet channel 22, the water inlet 20 is communicated with the water inlet channel 21, and a right end of the trigger 17 abuts against a power switch valve 23 of the power mechanism. When the trigger 17 is pressed, the water inlet valve 19 is opened to enable water to enter the water inlet channel 21, and the power switch valve 23 is actuated to enable the power mechanism to work. Due to the arrangement of the combination switch, the working efficiency is greatly improved.

On a rear side of the trigger 17 on the main body shell 16 is mounted a safety pin 24 which is movable in a lateral direction. In this embodiment, the safety pin 24 is located below the power switch valve 23 and is in particular mounted on the handle part of the main body shell 16. The safety pin 24 is polygonal in cross section and is triangular in this embodiment, which prevents the safety pin 24 from rotating. An open slot 25 is formed at a position on the safety pin 24 opposite to a position of the trigger 17, a stop plate 47 is formed at a position on the trigger 17 opposite to a position of the open slot 25, the width of the open slot 25 is larger than that of the stop plate 47, and the stop plate 47 is arranged to limit the safety pin 24 from moving out of the main body shell 16.

When the safety pin 24 is moved toward the outside, an outer edge of the safety pin 24 can abut against the rear end of the trigger 17 to realize stopping, so that the trigger 17 is prevented from being pressed down accidentally. When the safety pin 24 is moved inwardly, the trigger 17 is rotatable within the open slot 25, i.e. the trigger 17 can be depressed. By providing the safety pin 24, accidental touching of the trigger 17 is prevented and the safety of use of the pressure washer is improved.

Figure 7:
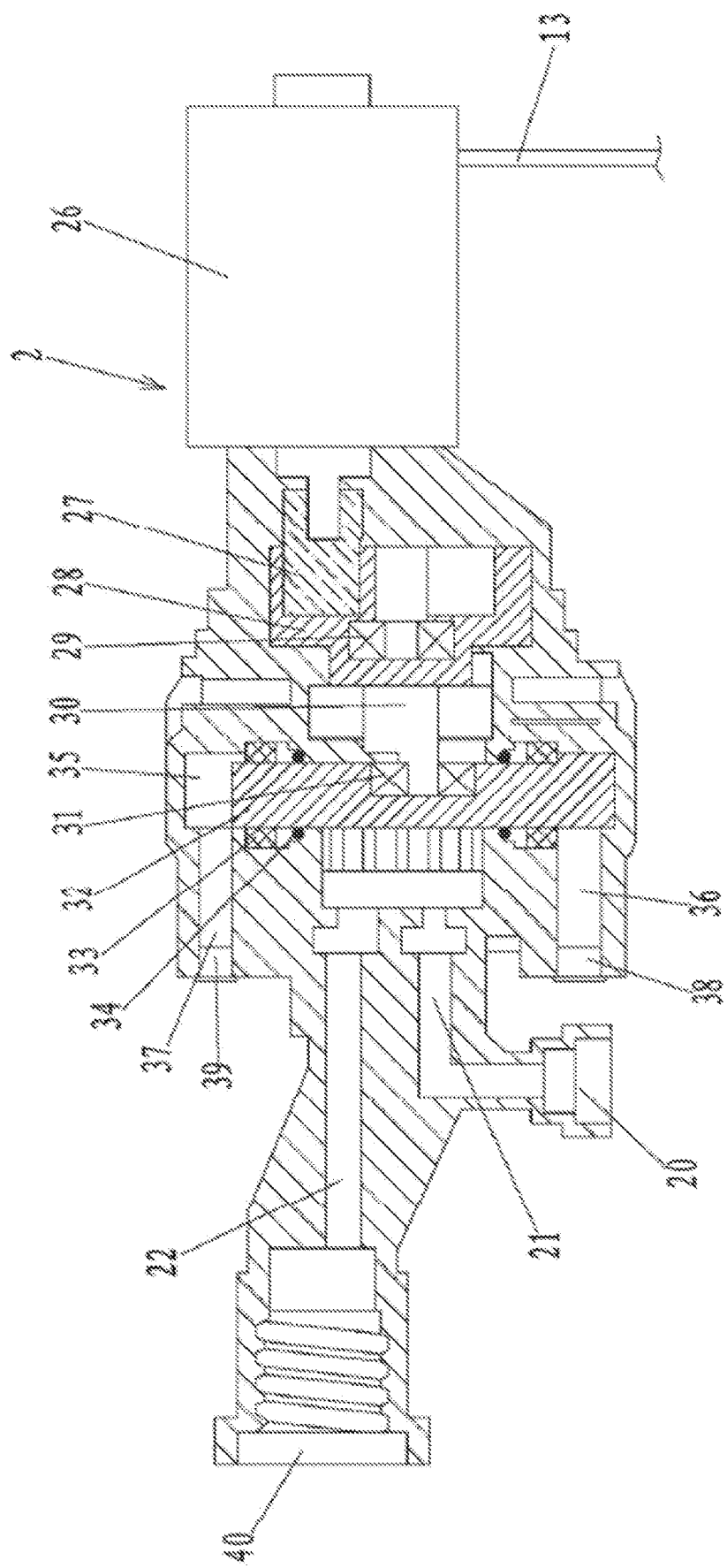
FIG. 7 is a schematic structural view of the power mechanism of embodiment 1 of the pressure washer of the utility model.

Referring to FIG. 7, the power mechanism includes a motor 26 connected to the battery pack 12 through an electric wire 13. The motor 26 is connected to a pinion 27 of a gear mechanism, an internal gear 28 of the gear mechanism is connected to an eccentric shaft 30 through a bearing 29, the eccentric shaft 30 is connected to a piston 32 through a bearing 31, and the piston 32 is sealingly disposed in a piston cavity 35 in the main body shell 16 through a water-sealed sealing ring 33 and an O-shaped sealing ring 34. A height of the piston cavity 35 is greater than a height of the piston 32.

An upper end of the piston cavity 35 communicates with the water outlet channel 23, and a lower end of the piston 32 communicates with the water inlet channel 21. A first water inlet cavity 36 is arranged between the water inlet channel 21 and the piston cavity 35, a second water inlet cavity 37 is arranged between the water outlet channel 22 and the piston cavity 35, two first one-way valves 38 for conducting and blocking are arranged on the first water inlet cavity 36 on a left side surface and a right upper surface, and two second one-way valves 39 for conducting and blocking are arranged on the second water inlet cavity 37 on a left side surface and a right lower surface. In this embodiment, taking the direction from the main body part 2 to the nozzle part 3 as a reference, the second one-way valve 39 on the left side and the first one-way valve 38 on the upper right side are opened when the piston 35 moves upward, the other two first one-way valve 38 and the second one-way valve 39 are closed, and conversely, when the piston 35 moves downward, the second one-way valve 39 on the lower right side and the first one-way valve 38 on the left side are opened and the other two first one-way valve 38 and second one-way valve 39 are closed, thus enabling pumping of water when the piston 35 is moved in both directions.

The above power switch valve 23 is a motor switch valve.

The transmission of the power mechanism drives the piston to move linearly and reciprocally, so that the piston 32 plays a pumping role, the use of the pump is omitted, the volume of the main body part 2 is reduced, and the pressure washer is convenient to use, small and practical.

Figure 8:
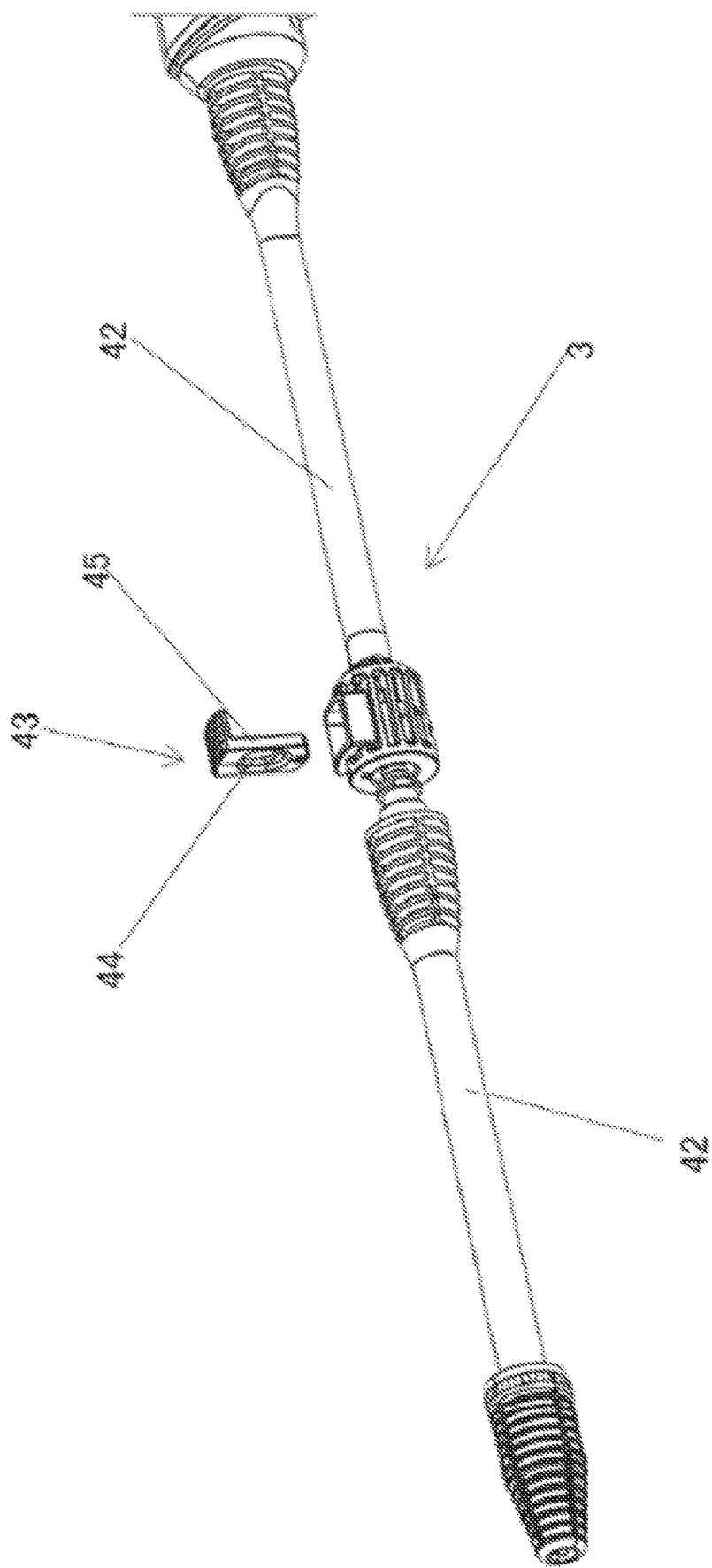
FIG. 8 is a three-dimensional exploded schematic structural view of a nozzle part of embodiment 1 of the pressure washer of the utility model.
Figure 9:
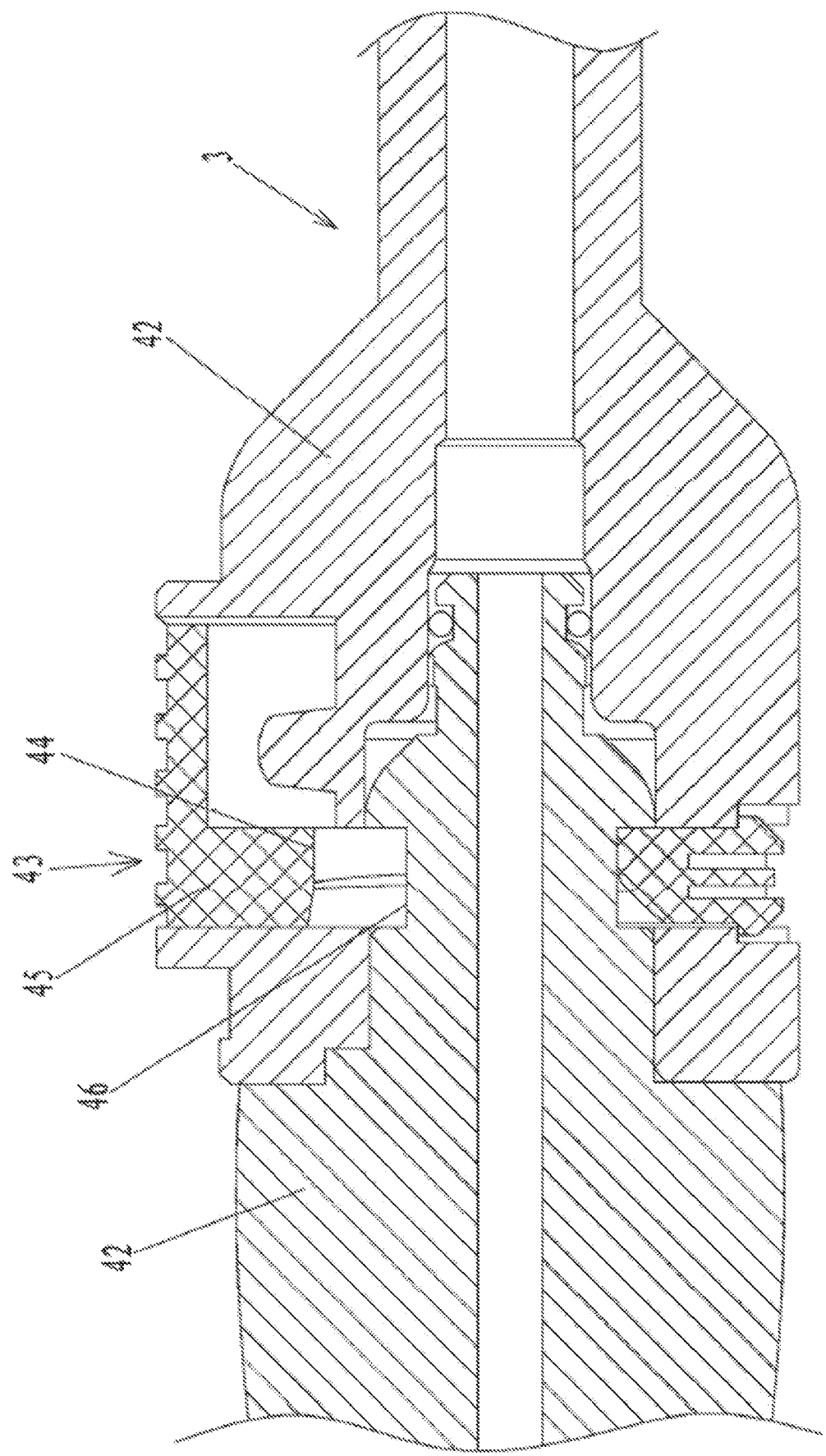
FIG. 9 is a schematic structural view of a connection between adjacent nozzles of the nozzle part of embodiment 1 of the pressure washer of the utility model.

The water outlet channel 22 of the main body part 2 is connected to the water outlet 40 which is connected to the nozzle part 3 by a threaded joint 41. As shown in connection with FIGS. 8 and 9, the nozzle part 3 comprises a plurality of nozzles 42, adjacent nozzles 42 being connected together by a quick connector 43.

The quick connector 43 comprises a clamping plate 45 with an opening 44 in middle, and ends of adjacent nozzles 42 are plugged together. An outer surface of a plugged part of the adjacent nozzles 42 is integrally formed with an annular groove 46, that is, the plugged part of the nozzle 42 on the outer side is provided with an annular hole, and the plugged part of the nozzle 42 on the inner side is provided with an annular groove, while the two are overlapped after being plugged to form an annular groove 46. The clamping plate 45 is sleeved on the annular groove 46 through an opening 44, a height of the opening 44 is larger than that of the annular groove 46, and a bottom surface of the opening 44 of the clamping plate 45 is attached to a bottom surface of the annular groove 46, so that the adjacent nozzles 42 are clamped together. When the clamping plate 45 is pressed downward to disengage the bottom surface of the opening 44 from the bottom surface of the annular groove 46, the adjacent nozzles 42 are quickly separated, and the nozzles 42 of different sizes can be quickly mounted and dismounted through the quick connector 43.

In operation, the safety pin 24 is first moved inwards to separate the safety pin 24 from the trigger 17. The trigger 17 is pressed down, and the trigger 17 pulls the connecting line 18 to drive the water inlet valve 19 to be separated from the water inlet 20, while the trigger 17 rotates to trigger the motor switch valve to be opened. The water inlet 20 introduces water into the water inlet channel 21 through external water inlet pipe, while the motor 26 drives a pinion 27 of the planetary gear mechanism to rotate, and the pinion 27 drives the internal gear 28 to rotate. The inner gear 28 drives the eccentric shaft 30 to rotate, and the eccentric shaft 30 drives the piston 32 to make up-and-down reciprocating linear motion in the piston cavity 35 to play a role in pumping water. Water entering the first water inlet cavity 36 through the first one-way valve 38 from the water inlet channel 21 is pumped out of the nozzle part 3 through the water outlet channel 22 and the water outlet 40 by controlling the first one-way valve 38 and the second one-way valve 39 in the up-and-down reciprocating linear motion of the piston 32.

Figure 10:
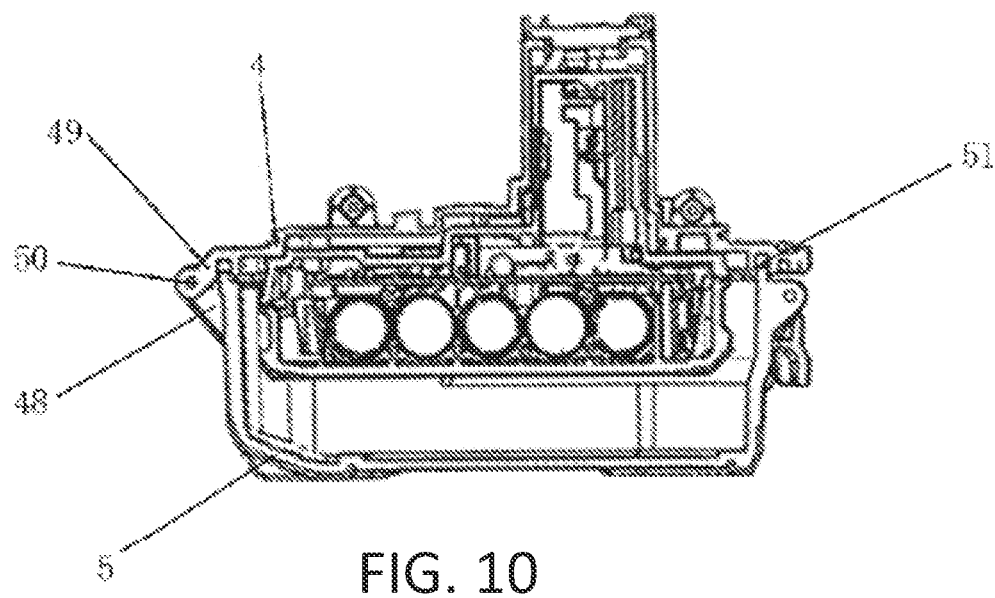
FIG. 10 is a schematic structural view of a water-sealed battery part of embodiment 2 of the pressure washer of the utility model.

FIG. 10 is a schematic structural view of a water-sealed battery part of embodiment 2 of the pressure washer of the utility model. Most of the structure of the pressure washer in the embodiment is the same as that in the embodiment shown in FIG. 2, and the same points are not described in detail. The difference lies in that the water-sealed battery part of the embodiment comprises a cavity 5 open at an upper end, the cover body 4 covers on an open upper end surface of the cavity 5 through a hinge structure, and the hinge structure comprises a first hinge seat 48 arranged at an upper part of a side wall of the cavity 5, a second hinge seat 49 arranged at a lower part of a side wall of the cover body 4, and a pin shaft 50 arranged between the first hinge seat 48 and the second hinge seat 49. A seal is arranged between the cover body 4 and the cavity 5 and adopts a waterproof O-shaped sealing ring 51.

Figure 11:
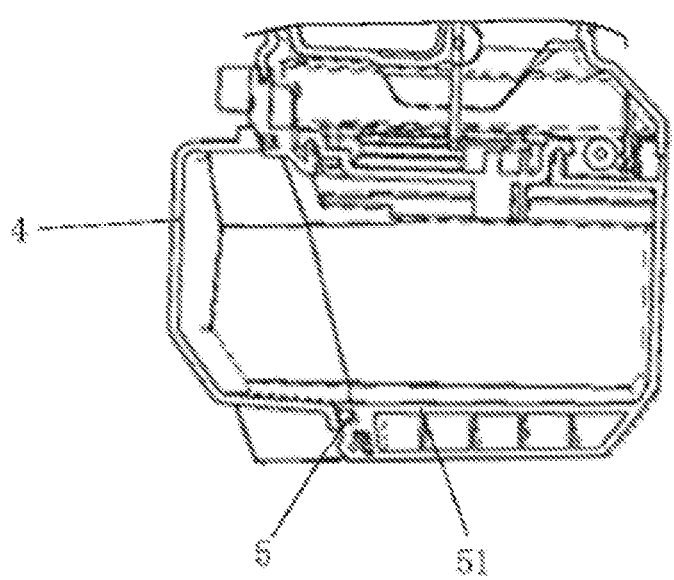
FIG. 11 is a schematic structural view of a water-sealed battery part of embodiment 3 of the pressure washer of the utility model.

FIG. 11 is a schematic structural view of a water-sealed battery part of embodiment 3 of the pressure washer of the utility model. Most of the structure of the pressure washer in the embodiment is the same as that in the embodiment shown in FIG. 10, and the same points are not described in detail. The difference lies in that the water-sealed battery part of the embodiment comprises a cavity 5 open at a side surface, and the cover body 4 covers on the open side surface of the cavity 5 through a hinge structure, a seal is arranged between the cover body 4 and the cavity 5, and the seal adopts a waterproof O-shaped sealing ring 51.

As used in the description and claims herein, the terms "comprise" "include", and variations thereof mean that the specified features, steps, or integer are included. The term should not be construed to exclude the presence of other features, steps or components.

The features disclosed in the description or claims, or the accompanying drawings, expressed in their specific forms or in terms of a means for providing the disclosed function, or a method or process for attaining the disclosed result, as appropriate, may, separately or in any combination, be utilized for realizing the invention in diverse forms thereof.

The invention claimed is:

1. A pressure washer comprising:
   a main body part;
   a water-sealed battery part operably coupled to the main body part, wherein the water-sealed battery part comprises a shell including a body defining a cavity and a cover coupled with the body to close the cavity, wherein the cover and the body of the shell are snap-connected together;
   a waterproof seal disposed between the body of the shell and the cover, wherein the waterproof seal is configured to outwardly release pressure generated in the cavity, wherein the waterproof seal comprises a sealing strip having a plurality of grooves; and
   a battery pack disposed in the cavity of the shell.

2. The pressure washer according to claim 1, wherein the body of the shell includes an opening, and the cover is disposed at the opening of the body.

3. The pressure washer according to claim 1, wherein the battery pack comprises a pin end, wherein the waterproof seal is disposed between the pin end of the battery pack and the body of the shell, and an O-shaped sealing ring is disposed between the pin end and the cover.

4. The pressure washer according to claim 1, wherein the main body part is provided above the water-sealed battery part, the main body part including a main body shell on which a combination switch and a power mechanism for pumping water are disposed, the combination switch including a trigger pivotally mounted on the main body shell, one end of the trigger connected with a water inlet valve, the water inlet valve being arranged at a water inlet of the main body shell, the water inlet being communicated with a water inlet channel in the main body shell, another end of the trigger abutting against a power switch valve of the power mechanism, and when the trigger is pressed; the water inlet valve and the power switch valve being simultaneously opened to work.

5. The pressure washer according to claim 4, wherein a safety pin movable in a lateral direction is mounted on the main body shell at a rear side of the trigger, and the safety pin is pressed against a rear end of the trigger by moving a position of the safety pin, thereby preventing accidental depression of the trigger.

6. The pressure washer according to claim 5, wherein a cross section of the safety pin is polygonal, the safety pin is provided with an open slot at a position opposite to a position of the trigger, and when the safety pin is moved, an outer edge of the safety pin is stopped against the rear end of the trigger or the trigger is rotatable in the open slot.

7. The pressure washer according to claim 4, wherein the power mechanism comprises a motor connected to the battery pack by means of an electric wire, the motor being connected to a pinion of a gear mechanism, an internal gear of the gear mechanism being connected to an eccentric shaft by means of a bearing, the eccentric shaft being connected to a piston by means of a bearing, the piston being arranged in a piston cavity in the main body shell through a sealing material, a water outlet being arranged on the main body shell, the water outlet being communicated with a water outlet channel arranged in the main body shell, and the water inlet channel and the water outlet channel being able to be communicated with or separated from the piston cavity through an one-way valve respectively.

8. The pressure washer according to claim 7, wherein the power switch valve is a motor switch valve.

9. The pressure washer according to claim 7, wherein the water outlet is connected to a nozzle part comprising a plurality of nozzles, adjacent nozzles being connected together by a quick connector comprising a clamping plate with an opening in middle, end portions of the adjacent nozzles being plugged together, an annular groove being formed on an outer surface of plugged end portions of the adjacent nozzles, the clamping plate being sleeved on the annular groove, and a bottom surface of an opening of the clamping plate being attached to a bottom surface of the annular groove, and the adjacent nozzles being clamped together.

10. The pressure washer according to claim 9, wherein a height of the opening is greater than a height of the annular groove.

11. A water-sealed battery part for a pressure washer, the water sealed battery part comprising:
- a shell including a body defining a cavity, and a cover coupled with the body to close the cavity;
- a waterproof seal disposed between the body of the shell and the cover, wherein the waterproof seal is configured to outwardly release pressure generated in the cavity, and wherein the waterproof seal comprises a sealing strip having a plurality of grooves; and
- a battery pack disposed in the cavity of the shell.

12. The water-sealed battery part of claim 11, wherein the waterproof seal comprises an S-shape when viewed from a side view.

13. A method of using a water-sealed battery part for a pressure washer, the method comprising:
- providing a water-sealed battery part including a shell having a cover and a body defining a cavity;
- installing a battery pack into the cavity; and
- connecting the body and cover together such that a waterproof seal disposed between the body and the cover forms a one-way seal between the body and the cover, the one-way seal being configured to prevent ingress of water into the cavity while allowing outward release of pressure from the cavity, the waterproof seal comprising an S-shape when viewed from a side view.

14. The method of claim 13, wherein connecting the body and cover together is performed by snap-connecting the body and cover together.

15. The method of claim 13, further comprising:
- connecting the water-sealed battery part to a pressure washer;
- powering the pressure washer using the battery pack; and
- venting pressure from the cavity at an interface between the cover and the body at a location of the waterproof seal.

* * * * *